US008249777B2

(12) United States Patent
Greul et al.

(10) Patent No.: US 8,249,777 B2
(45) Date of Patent: Aug. 21, 2012

(54) DETERMINING A TARGET STEERING TORQUE IN A STEERING DEVICE

(75) Inventors: Roland Greul, Schwaebisch Gmuend (DE); Thomas Werner, Rainau (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 13/136,532

(22) Filed: Aug. 3, 2011

(65) Prior Publication Data

US 2012/0072074 A1   Mar. 22, 2012

Related U.S. Application Data

(63) Continuation of application No. PCT/EP2010/050400, filed on Jan. 14, 2010.

(30) Foreign Application Priority Data

Feb. 5, 2009   (DE) .......................... 10 2009 000 638

(51) Int. Cl.
   *B62D 6/00*   (2006.01)
(52) U.S. Cl. ........................................................ 701/41
(58) Field of Classification Search .............. 701/41–44; 477/1; 475/18–19; 180/6.2
   See application file for complete search history.

(56) References Cited

U.S. PATENT DOCUMENTS

| | | | |
|---|---|---|---|
| 4,834,203 A | | 5/1989 | Takahashi et al. |
| 5,481,457 A | * | 1/1996 | Yamamoto et al. ............. 701/41 |
| 5,828,972 A | | 10/1998 | Asanuma et al. |
| 5,845,222 A | * | 12/1998 | Yamamoto et al. ............. 701/41 |
| 5,908,457 A | * | 6/1999 | Higashira et al. ................ 701/41 |
| 6,082,482 A | * | 7/2000 | Kato et al. ..................... 180/402 |
| 6,108,599 A | * | 8/2000 | Yamamoto et al. ............. 701/41 |
| 6,148,951 A | * | 11/2000 | Nishi et al. ..................... 180/446 |
| 6,239,568 B1 | | 5/2001 | Sugitani et al. |
| 6,527,079 B2 | | 3/2003 | Takauchi et al. |
| 6,931,313 B2 | | 8/2005 | Kato et al. |
| 7,275,617 B2 | | 10/2007 | Endo et al. |
| 7,383,111 B2 | | 6/2008 | Takimoto et al. |
| 7,878,295 B2 | | 2/2011 | Kato et al. |

(Continued)

FOREIGN PATENT DOCUMENTS

DE                42 32 256              4/1993

(Continued)

*Primary Examiner* — Yonel Beaulieu
(74) *Attorney, Agent, or Firm* — Jordan and Hamburg LLP

(57) ABSTRACT

In order to achieve a steering feel for SbW systems and EPS systems having a control design for controlling the steering torque by generating a target steering torque (torTB) that can be adapted to various steering systems, vehicle types, or requirements, in which the resulting steering feel is a steering feel, in all driving conditions and driving situations, which is equivalent to, or better than, hydraulic and electromechanical steering systems available on the market today, according to the invention: a base steering torque (torB) is determined as a function of an externally acting force (torR) and a vehicle speed (velV); a damping torque (torD) is determined as a function of a steering speed (anvSW) and the vehicle speed (velV); a hysteresis torque (torF) is determined as a function of the steering speed (anvSW) and the vehicle speed (velV); a centering torque (torCF; torC) in the direction of the straight-ahead position is determined as a function of a steering wheel angle (angSW) and the vehicle speed (velV); and the base steering torque (torB), the damping torque (torD), the hysteresis torque (torF) and the centering torque (torCF; torC) form individual components, as a function of which the target steering torque (torTB) is determined.

20 Claims, 2 Drawing Sheets

U.S. PATENT DOCUMENTS

| | | |
|---|---|---|
| 2002/0033300 A1 | 3/2002 | Takeuchi et al. |
| 2005/0071061 A1 | 3/2005 | Kato et al. |
| 2006/0042860 A1 | 3/2006 | Endo et al. |
| 2006/0064214 A1 | 3/2006 | Takimoto et al. |
| 2008/0294355 A1 | 11/2008 | Berthold et al. |
| 2009/0026003 A1 | 1/2009 | Kato et al. |

FOREIGN PATENT DOCUMENTS

| | | |
|---|---|---|
| DE | 197 51 125 | 9/1998 |
| DE | 103 32 023 | 2/2004 |
| DE | 10 2005 044 896 | 3/2006 |
| DE | 699 32 492 | 1/2007 |
| DE | 10 2007 011 313 | 9/2008 |
| DE | 10 2007 040 064 | 2/2009 |
| EP | 1 138 578 | 10/2001 |
| EP | 1 514 765 | 3/2005 |
| EP | 1 625 993 | 2/2006 |
| EP | 2 020 363 | 2/2009 |
| GB | 2 206 321 | 1/1989 |
| WO | WO-2005/092690 | 10/2005 |

* cited by examiner

DETERMINING A TARGET STEERING TORQUE IN A STEERING DEVICE

BACKGROUND OF THE INVENTION

The invention relates to a method for determining a target steering torque for a steering means of a steering device in a vehicle.

The invention also relates to a controller for controlling a steering device in a vehicle. The invention further relates to a computer program that can be executed on a controller for controlling a steering device in a vehicle.

In modern steering devices, for example in an electric power steering (EPS) system or in what is referred to as a Steer-by-Wire (SbW) steering system, a target steering torque is determined, which is applied to a steering means, such as a steering wheel, in order to counteract the force applied by the driver or support the force applied by the driver. The target steering torque can also be referred to as the target manual torque. This is intended to convey a driving experience to the driver that corresponds to the current driving situation. In a conventional steering system, in which a mechanical connection exists between the steering means and the wheels to be steered, the target steering torque decisively depends on cornering forces that act on the steering device, and ultimately on the steering means, via a steering linkage.

In SbW steering systems, the target steering torque is generated, for example, by means of a suitable steering wheel actuator. In an EPS system, in which a mechanical connection exists between the steering wheel and the wheels to be steered, modern control designs allow a target steering torque that corresponds to the target manual torque to be established so as to generate a desired steering feel at the steering wheel. To this end, an electric motor, or an electromechanical servo unit, is actuated or adjusted so that the target steering torque is set in accordance with the desired target manual torque. The target steering torque can specify the torque at the torsion bar, or the torque at the steering wheel.

Various approaches exist for calculating the target manual torque, or for calculating the target steering torque, for both SbW systems and for EPS systems having a control design for controlling the steering torque. Depending on the type of the steering system, the steering torque corresponds, for example, to the manual torque and/or to what is referred to as the torsion bar torque. The aforementioned approaches are based on various application functions; however, when combined, they do not convey a satisfactory steering feel in some driving conditions, or in some driving situations. For example, the current transverse acceleration, in the form of the toothed rack force, can be taken into consideration in determining the target steering torque. In addition, further variables may be included. Moreover, existing application functions can be included, which take into consideration, for example, additional moments of friction, so that the effect of the transverse acceleration actually experienced at the steering means can be represented more realistically.

In principle, determining the target steering torque first entails the problem of selecting suitable input variables. These input variables can then be combined in a variety of ways, such that the influence of an individual input variable is frequently no longer fully traceable, and thus it is difficult to correct or improve the target steering torque.

SUMMARY OF THE INVENTION

It is the object of the present invention to achieve a steering feel, both for SbW systems and for EPS systems having a control design for controlling the steering torque, by generating a target steering torque. The steering feel, or the target steering torque, must be adaptable to various steering systems, vehicle types, or requirements. The resulting steering feel must be a steering feel that is equivalent to, or better than, hydraulic and electromechanical steering systems available on the market today, in all driving conditions and driving situations. This is intended to provide the driver with reliable and precise information, to as great an extent as possible, on current driving conditions and driving situations by way of the target steering torque and by way of the steering means.

The object is achieved by a method of the type mentioned above, by finding the target steering torque as a function of individual components, with the individual components comprising at least one base steering torque, a damping torque, a hysteresis torque and a centering torque. These individual components can be combined into the target steering torque, for example by way of addition.

The base steering torque is determined as a function of an externally acting force, this being, for example, the toothed rack force, or a transverse acceleration determined by means of a suitable sensor, and as a function of a vehicle speed. The base steering torque thus generates a base steering force level, in which the current toothed rack force is taken into consideration as a function of the current speed. The base steering force level is preferably generated by characteristic torque curves that can be applied and are dependent on the toothed rack force. There exist various progressions of the characteristic base steering torque curves for various speeds. These various progressions of the characteristic base steering torque curves can be determined, for example, as a function of a certain vehicle, or a comfort level or a steering feel to be achieved. The base steering torque can be used to achieve what is referred to as the servotronic effect known from hydraulic steering systems. According to a different embodiment, the base steering torque is generated by means of a characteristic map, whereby the base steering torque is determined as a function of a current vehicle speed and a current externally acting force.

The damping torque is determined as a function of a steering speed, such as a steering wheel speed, and the vehicle speed. This generates active damping, which allows the driver to be assisted in the steering process, for example by stabilizing the steering. For this purpose, it may be possible to specify a higher steering torque for a high vehicle speed and a high steering speed so as to reduce the risk of oversteering.

The hysteresis torque is determined as a function of the current steering speed and the current vehicle speed. The hysteresis torque opposes the steering wheel movement and thus allows friction to be represented. The hysteresis torque is advantageously additionally determined as a function of a current steering torque, whereby the steering experience is improved even further.

The centering torque is determined as a function of a steering angle and the vehicle speed. The centering torque generates a steering torque in the direction of the straight-ahead position of the steering means, whereby an improved steering feel is achieved. Given the dependence on the vehicle speed, the centering torque can, for example, be raised at high vehicle speeds and reduced at low vehicle speeds. The centering torque is preferably generated so that it depends on a predefinable angular range around the straight-ahead position. As a result, this allows a minor deviation from the straight-ahead position to be easily signaled by way of the contribution to the target steering torque, whereas it can be assumed that a major deviation from the straight-ahead position does not require a particular contribution of the centering torque to the target steering torque because the greater deviation is being sufficiently signaled by other components.

The method according to the invention thus allows precise determination of individual moments that are intended to contribute to the target steering torque. Moreover, the contribution of each individual components can be adapted particularly well to various steering systems, vehicle types or desired steering feels. To this end, it is particularly advantageous if the contribution of at least one individual component can be applied. This can be achieved, for example, by multiplying each individual component by a factor that can be predefined for this individual component, and by then adding the products thus obtained to the target steering torque. This allows, for example, a component to be entirely suppressed (factor=0) so as to determine a fault, or undesirable behavior, particularly easily and reliably in the determination of the target steering torque. Moreover, the contribution of each component can be amplified (factor>1) or diminished (factor<1). In this way, an application can be executed particularly well, because the influence of the individual components on the entire target steering torque can be predefined or controlled. This further makes it possible to automatically predefine the contributions of the individual components in accordance with a predefinable driving mode. For example, if a rather "spirited" driving mode is desired, the contribution of individual components to the target steering torque can be adapted accordingly. A spirited driving mode can differ from a luxurious driving mode, for example, by transmitting more information about the current transverse acceleration to the driver in the spirited driving mode.

According to an improved embodiment, a return torque is determined as a function of the steering angle, the vehicle speed and the steering speed and serves as a further individual component. The return torque brings about what is referred to as an active return by generating a steering torque in the direction of the straight-ahead position, so that a target steering speed that is dependent on the steering angle and the vehicle speed is established. Depending on the steering speed, a steering torque component is restoring or damping. This enables even further improved self-alignment.

According to another preferred embodiment, first a base steering torque with self-alignment is determined as a function of the base steering torque and the centering torque in an intermediate step. Then the target steering torque is found as a function of the base steering torque with self-alignment and the damping torque and hysteresis torque. Moreover, a target steering wheel speed is preferably determined as a function of the vehicle speed and the steering angle, and the base steering torque with self-alignment is additionally determined as a function of the target steering wheel speed that is determined, the steering angle and the steering speed.

This embodiment implements a quasi-static steering force level solely by way of the base steering torque. Given the dependence on the steering rack force or on the externally acting force, the base steering torque already generates a return behavior that is comparable to the return of a conventional hydraulic steering system. However, to attain improved return behavior and generate an improved target steering torque, a self-alignment torque and a damping torque are taken into consideration, analogously to the aforementioned active return.

A switch is preferably made from the base steering torque with self-alignment to an undamped self-alignment torque, when a detected actual steering speed is lower than a predefinable target steering speed and when the base steering torque is less than the originally required self-alignment torque. These conditions exist, for example, when the driver takes their hands off the steering wheel while driving, and thus does not transfer any moment to the steering system. This automatically prompts a switch to an undamped self-alignment torque, which effects a self-alignment of the steering into the straight-ahead position and increases safety.

Advantageously at least one further moment is determined and added to the target steering torque. The additional moment can be, for example, information about the driving conditions, the tire conditions, or the condition or type of the roadway surface. The moment can moreover be part of a drive assist system, by means of which tracking or autonomous driving is implemented. For example, a hazardous situation can be indicated by vibrating the steering means, or advice for a recommended steering direction can be displayed. Such moments are particularly helpful for safely driving a vehicle and can be taken into consideration and applied with particular ease by means of the method according to the invention.

It is particularly important to implement the method according to the invention in the form of a computer program, which can be executed on a controller for controlling a steering unit in a vehicle, and notably on a microprocessor in the controller, which is programmed to carry out the method according to the invention. In this case, the invention is implemented by the computer program, and thus this computer program represents the invention in the same manner as the method does, the computer program being programmed for the execution thereof. The computer program is preferably stored in a memory element. The memory element used can notably be an optical, electric or magnetic storage medium, for example a random access memory, a read-only memory, a flash memory, a hard drive, or a digital versatile disk (DVD).

The object is also achieved by a controller of the type mentioned above that comprises the controller means for carrying out the method according to the invention. These means are implemented, for example, in the form of a computer program that is executed by the controller.

Additional characteristics, application options and advantages of the present invention will be apparent from the following description of exemplary embodiments of the invention, which will be described based on the drawings.

DESCRIPTION OF THE PREFERRED EMBODIMENTS

Figure 1:
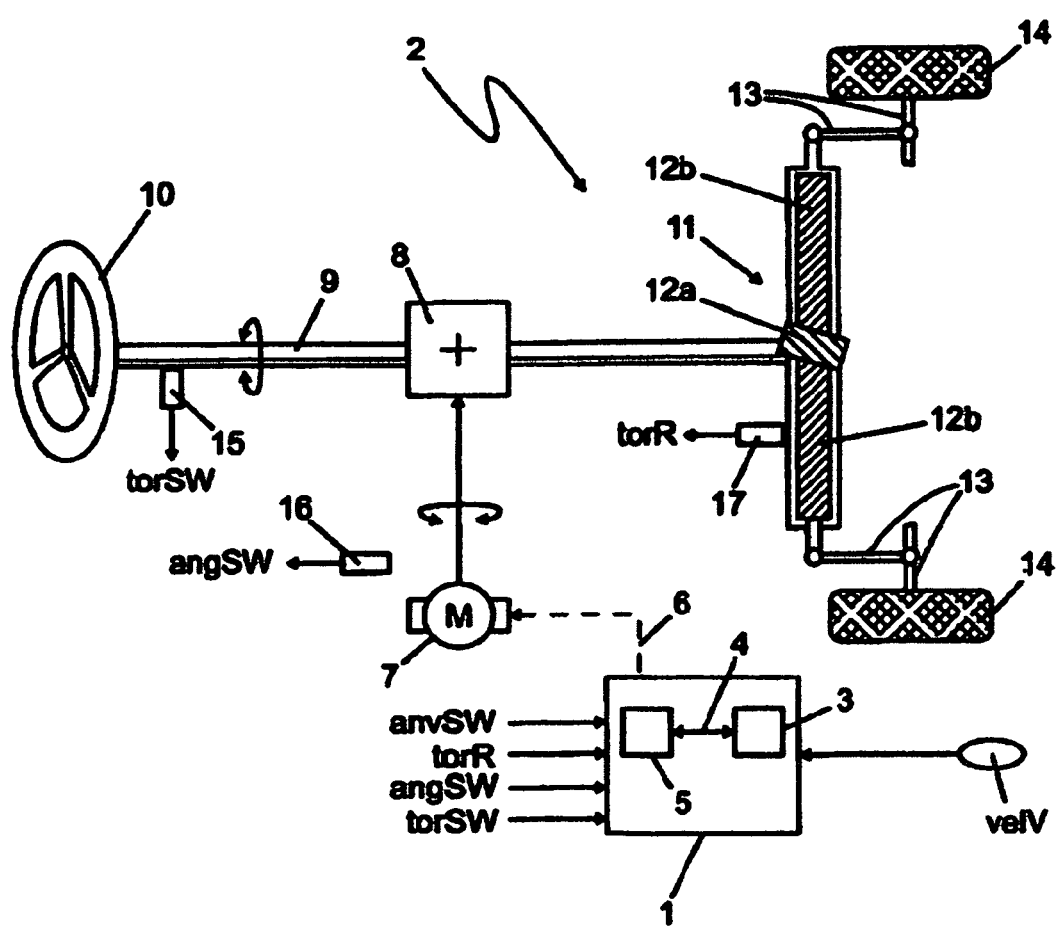
FIG. 1 is a steering device comprising a controller according to the invention.

FIG. 1 shows a controller 1, which is associated with a steering device 2. A microprocessor 3 is disposed in the controller 1 and is connected via a data line 4, such as a bus system, to a memory element 5. The controller 1 is connected, via a signal line 6, to a motor 7, such as an electric motor, whereby the controller 1 can control the power of the motor 7. The motor 7 acts on a torsion bar 9 via a transmission 8. A steering means 10, such as a steering wheel, is disposed on the torsion bar 9 and can be used to apply a torque to the torsion bar 9 as a result of a driver actuating the steering means 10.

The steering device 2 moreover comprises a steering gear 11, which is designed, for example, as a rack-and-pinion steering gear. The steering gear can further be designed as a ball-and-nut gear or recirculating-ball gear. The description hereafter primarily assumes a rack-and-pinion steering gear—to the extent necessary—in which the steering gear 11 comprises a pinion 12a and a toothed rack 12b. The steering gear 11 is connected to the wheels 14, for example, by way of the pinion 12a and the toothed rack 12b and by a steering linkage 13.

The steering device 2 further comprises a torque sensor 15 for detecting a steering torque torSW and a sensor 16 for detecting a steering wheel angle angSW. In the exemplary embodiment shown in FIG. 1, the sensor 16 is associated with the motor 7, so that the sensor 16 detects a rotor angle of the motor 7. This angle corresponds to the steering wheel angle angSW (potentially with the exception of a factor that denotes a gear ratio) because the motor 7 cooperates with the torsion bar 9, and thus with the steering means 10, via the transmission 8. The steering wheel angle angSW can also be detected by means of a sensor that is associated with the steering means 10 or the torsion bar 9. The sensor 16 disposed on the motor 7, however, can achieve a higher resolution by detecting the rotor angle.

The steering device 2 further comprises a sensor 17, which can be used to determine a toothed rack force torR. The toothed rack force torR corresponds to a transverse acceleration or a cornering force acting on the toothed rack 12b by way of the wheels 14 and the steering linkage 13. It would also be possible, of course, to determine the transverse acceleration or toothed rack force torR using other known methods. The toothed rack force torR is transmitted to the controller 1.

In an alternative embodiment, the toothed rack force torR is estimated based on other variables. This estimation is also carried out, for example, by means of the controller 1. In this case, it is, of course, not necessary to detect the toothed rack force torR by means of the sensor 17 and transmit a corresponding signal to the controller 1.

The steering torque torSW detected by the torque sensor 15 and the steering wheel angle angSW detected by the sensor 16 are likewise transmitted to the controller 1. Moreover, a current vehicle speed velV is transmitted to the controller or calculated there based on other variables. A steering speed anvSW is also supplied to the controller 1. The steering speed anvSW denotes the rotational speed by which the steering means 10, and thus the torsion bar 9, can be actuated. The steering speed anvSW can be captured by way of a suitable sensor, for example at the torsion bar 9. It is also possible for the steering speed anvSW to be found by the controller 1, for example as a function of the existing steering wheel angle angSW and the time.

Figure 2:
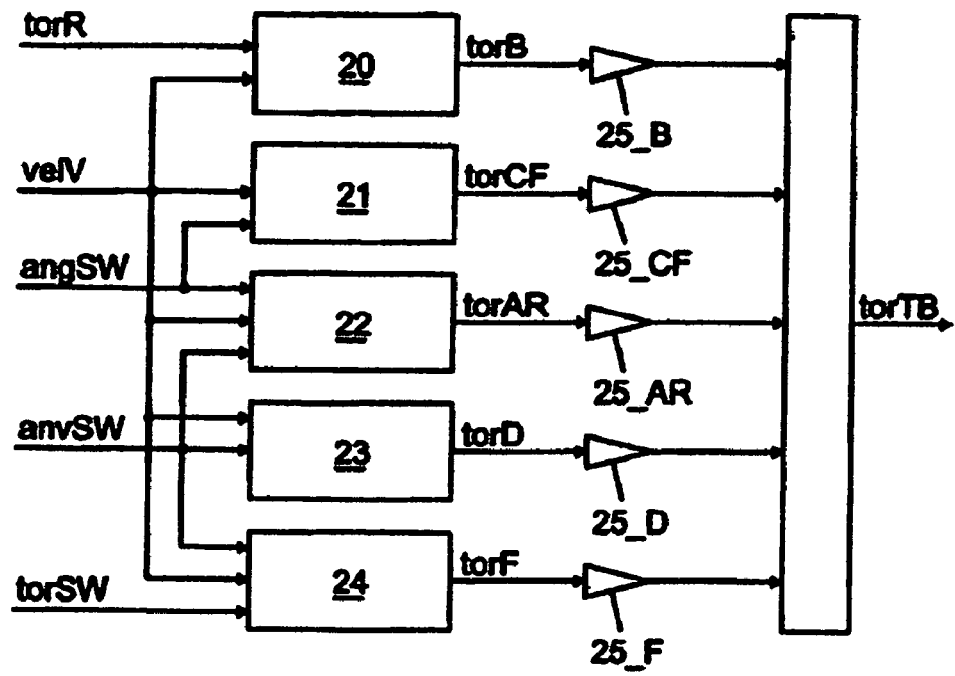
FIG. 2 is a schematic block diagram of a functionality according to the invention for determining a target steering torque according to a first exemplary embodiment.
Figure 3:
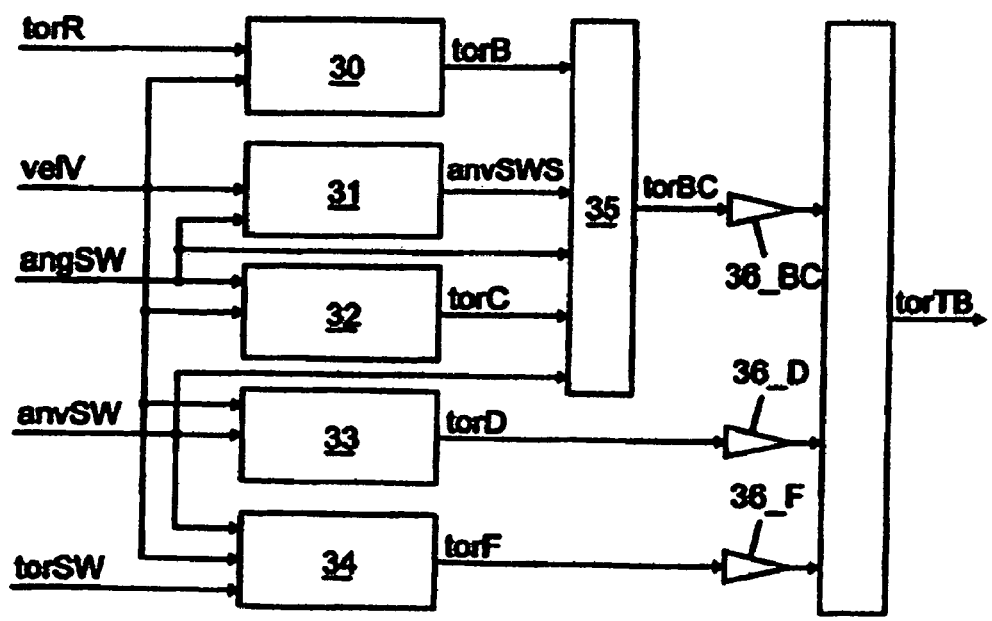
FIG. 3 is a schematic block diagram of a functionality for determining a target steering torque according to a second exemplary embodiment.

The operating principle of the method for determining a target steering torque which is executed in the controller 1 is shown based on the block diagrams of exemplary embodiments in FIGS. 2 and 3. The method is realized here in the form of a computer program, in which the individual blocks, or the functionalities corresponding thereto, are suitably implemented. The computer program is stored, for example, in the memory element 5 and is executed on the microprocessor 3.

FIG. 2 shows a function 20, by means of which a base steering torque torB is generated as a function of the toothed rack force torR and the vehicle speed velV. The base torque represents a base steering force level, which is determined, for example, by way of characteristic torque curves that can be applied and that are dependent on the toothed rack force torR. To this end, various progressions of the characteristic torque curves for various speed ranges are stored in the function 20 or are accessible to the function 20. This allows functions that are known from hydraulic steering systems to be implemented. For example, it may be provided that a higher base steering torque is generated at a higher speed, whereby the servotronic effect known from hydraulic steering systems is achieved.

Moreover, the use of the toothed rack force results in improved feedback of information about the force conditions for the road-wheel contact. In this way, feedback is implicitly provided for information regarding a friction coefficient, the unevenness of the roadway surface, or a current driving condition, such as understeering or oversteering, for example.

In a function 21, a centering torque torCF is generated as a function of the vehicle speed velV and the steering wheel angle angSW. The centering torque torCF presents itself to the driver at the steering wheel 10 as what is referred to as center point feeling. The centering torque torCF ensures that a steering torque in the direction of the straight-ahead position of the steering means 10 is generated as a function of the current steering wheel angle angSW so as to improve the steering feel around the straight-ahead position of the steering wheel.

In a function 22, what is referred to as active return torAR is generated as a function of the steering wheel angle angSW, the vehicle speed velV and the steering speed anvSW, with this active return providing a steering torque in the direction of the straight-ahead position of the steering wheel, whereby a target steering speed, which is dependent on the steering wheel angle angSW and the vehicle speed velV, is established. Depending on the actual steering speed anvSW, the moment is restoring or damping.

In a function 23, a damping torque torD, or what is referred to as active damping, is generated as a function of the steering speed anvSW and the vehicle speed velV.

In a function 24, a hysteresis torque torF is generated as a function of the steering torque torSW, the vehicle speed velV and the steering speed anvSW. The hysteresis torque torF can also be referred to as a moment of friction, because it emulates friction that counteracts the steering wheel movement and the steering speed direction. In this way, the steering feel that is achieved, for example in SbW systems, comes close to that of conventional power steering, in which a mechanical connection exists between the steering gear 11 and steering means 10.

The base steering torque torB, the centering torque torCF, the self-alignment torque torAR, the damping torque torD and the hysteresis torque torF are respectively conducted to an element 26 by one of the elements 25_B, 25_CF, 25_AR, 25_D and 25_F. In the element 26, the transmitted moments are superimposed, for example by way of addition, thus generating the target steering torque torTB.

The value of the respective moments torB, torCF, torAR, torD and torF can be reduced or amplified by means of the elements 25_B, 25_CF, 25_AR, 25_D and 25_F. The elements 25_B, 25_CF, 25_AR, 25_D and 25_F thus implement the abovementioned factors that make it possible to set the value of an individual moment torB, torCF, torAR, torD and torF, or the contribution of an one or more moments torB, torCF, torAR, torD and torF to the overall target steering torque torTB, to zero. This is advantageous, for example, when a target manual feel or a target steering torque torTB is applied to a particular vehicle. It is therefore particularly easy to check which individual component is the cause of an undesirable or faulty signal, and thus makes an undesirable or faulty contribution to the target steering torque torTB. Undesirable or faulty moments can develop in the system as a result of vibrations. This process thus allows better adaptability of the entire functionality.

The elements 25_B, 25_CF, 25_AR, 25_ and 25_F also allow for easy switching between various steering feels. For this purpose, the elements 25_B, 25_CF, 25_AR, 25_ and 25_F are parameterized, for example, so that, by predefining parameters, various steering feels can be directly implemented, for example by selection in a menu in the vehicle. This can be achieved particularly easily if the parameters correspond to the respective factors. According to an advantageous embodiment, at least one parameter is automatically determined as a function of a current driving condition.

In the exemplary embodiment shown in FIG. 2, a quasi-stationary steering force level is obtained from the base steering torque torB, the centering torque torCF and the active return or the return torque torAR. In this exemplary embodiment, active steering wheel self-alignment in the direction of the straight-ahead position is influenced not only by the return torque torAR, but also by the centering moment of the centering torque torCF. In addition, functional coupling exists between the return torque torAR and the damping torque torD or the active damping, because these two moments generate a damping torque as a function of the respective application.

In order to make it even easier to apply the desired steering feel, in the exemplary embodiment shown in FIG. 3, the moments influencing the quasi-stationary steering force level are functionally decoupled. For this purpose, in the exemplary embodiment shown in FIG. 3, in a function 30, first a base steering torque torB is generated, which corresponds to the base steering torque torB shown in FIG. 2.

In a function 31, a target steering wheel speed anvSWS is generated as a function of a current vehicle speed velV and a current steering wheel angle angSW. The significance of the target steering wheel speed anvSWS will be described in more detail hereafter in connection with other functions.

In a function 32, a centering torque torF is generated as a function of the current vehicle speed velV and the steering wheel angle angSW. As with the centering torque torCF described in relation to 2, this centering torque torC is a steering torque that acts in the direction of the straight-ahead position of the steering wheel. The centering torque torC, however, is primarily used as a centering or self-alignment torque, while the centering torque torCF described in relation to FIG. 2 is primarily used to generate a center point feeling. The portion of the target steering torque torTB responsible for self-alignment is implemented in the exemplary embodiment shown in FIG. 2 by means of the return torque torAR or the active return.

In a function 33, a damping torque torD is generated, which corresponds to the damping torque torD represented by the function 23 in FIG. 2. In a function 34, a hysteresis torque torF is generated, which corresponds to the hysteresis torque torF represented in FIG. 2 and generated by function 24.

The damping torque torD and the hysteresis torque torF are conducted to a function 37 by elements 36_D and 36-F. The elements 36_D and 36_F correspond to the elements 25_D and 25_F. As with the function 26, the function 37 is used to combine the individual moments that are generated, and is achieved by way of addition, for example, whereby the target steering torque torTB to be generated is obtained.

The moments torB and torC generated by the functions 30 and 32, and the target steering wheel speed anvSWS generated by the function 31, are supplied to a function 35. Using these moments and the steering wheel angle angSW and the steering speed anvSW, the function 35 finds a base steering torque with self-alignment torBC, which is supplied to the function 37 via an element 36_BC. The element 36_BC acts analogously to the elements 36_D and 36_F and consequently allows the contribution of the base torque with self-alignment torBC to the target steering torque torTB to be reduced, amplified or entirely eliminated.

The exemplary embodiment shown in FIG. 3 shows improved functional decoupling of the individual application functions 30, 31, 32, 33 and 34 by first implementing the quasi-static steering force level by way of the base steering torque torB. Given the dependence on the toothed rack force torR, the base steering torque torB already generates a return behavior that is comparable to the return of a conventional hydraulic steering system. However, in the same manner as with the active return, or the return moment torAR shown in FIG. 2, a self-alignment torque torC and a damping torque torC are also required for improved return behavior.

By means of the function 35, a switch is made in the exemplary embodiment shown in FIG. 3 from the base steering torque torB to an undamped self-alignment torque, when the current steering speed anvSW is lower than the applicable target steering speed anvSWS, and when the base steering torque torB is less than the required self-alignment torque torC. The switch behavior can, of course, likewise be adjusted, whereby the functionality 35 can also be adapted to various vehicle types or steering feels that are to be achieved.

The function 35 can be suitably parameterized for this purpose. In addition, or simultaneously, the damping can be influenced or applied by means of the function 33, and the damping torque torD generated by this function 33, independently of a current steering force level and a self-alignment torque.

In principle, existing known electromechanical steering systems supply very little or no roadway feedback. Using the method or application structures according to the present invention, improved roadway feedback can be achieved. Because the information to be fed back, for example a change in the cornering force, is contained in the toothed rack force torR that is employed, this change in toothed rack force results in a corresponding change in the base steering torque, which in turn influences the target steering torque. A change in the cornering force can result, for example, from a change in a friction coefficient, an unevenness of the roadway, or during oversteering or understeering. The power of the implied roadway or driving condition feedback depends on the gradient of an applicable characteristic curve, by means of which the base steering torque is determined.

As mentioned above, the present example employs the toothed rack force torR on which the base steering torque torB depends. However, the base steering torque torB can, of course, also be applied as a function of another variable representing the cornering forces of the tires. A suitable variable is, for example, the transverse acceleration instead of the toothed rack force.

Using the proposed application structures, it is further particularly easy to transmit additional information about the target steering torque to the driver. For example, if a sudden change in the toothed rack force torR is detected, prompt amplified feedback can be provided so as to draw the attention of the driver to the drastic change. To this end, for example, an amplification can take place as a function of a current wheel speed, wherein at higher speeds the influence on the target steering torque can be increased. The wheel speeds can be used to detect or plausibilize interference, wherein a current difference in the wheel speeds of various wheels can notably be used.

Using the proposed application structures, further moments can be added with particular ease. For example, steering wheel rocking can be added by way of simple addition, so as to point out a particular hazard or prompt a driver, who may have become sleepy, to be attentive.

The proposed application structures can be implemented entirely independently of the underlying steering system. While FIG. 1 shows an electric rack-and-pinion steering gear, the proposed application structures can also be employed in a SbW system. Here, the motor 7 is then actuated, for example, so as to generate the manual steering torque torTB, wherein an additional electric motor, which is not shown, generates the actual steering torque, because no mechanical connection exists between the steering wheel, or the steering means 10, and the steering gear 11. The motor 7 can, of course, act on the torsion bar 9, the toothed rack 12b, the steering gear 11 or the steering means 10 in the known manner in various locations.

The invention claimed is:

1. A method for determining a target steering torque (torTB) for a steering means of a steering device in a vehicle, comprising:
   a base steering torque (torB) is determined as a function of an externally acting force (torR) and a vehicle speed (velV);
   a damping torque (torD) is determined as a function of a steering speed (anvSW) and the vehicle speed (velV);
   a hysteresis torque (torF) is determined as a function of the steering speed (anvSW) and the vehicle speed (velV);
   a centering torque (torCF; torC) in the direction of the straight-ahead position is determined as a function of a steering wheel angle (angSW) and the vehicle speed (velV); and
   the base steering torque (torB), the damping torque (torD), the hysteresis torque (torF) and the centering torque (torCF; torC) form individual components, as a function of which the target steering torque (torTB) is determined.

2. A method according to claim 1, wherein the hysteresis torque (torF) and/or the damping torque (torD) are additionally determined as a function of a steering torque (torSW).

3. A method according to claim 1, wherein the base steering torque (torB) is determined by means of predefinable characteristic base steering torque curves, with characteristic base steering torque curves having various progressions being provided for at least two different speed ranges.

4. A method according to claim 1, wherein the centering torque (torCF; torC) is generated in a predefinable angular range around the straight-ahead position.

5. A method according to claim 1, wherein the externally acting force (torR) corresponds to a toothed rack force and/or a cornering force.

6. A method according to claim 1, wherein a return torque (torAR) is determined as a function of the steering wheel angle (angSW), the vehicle speed (velV) and the steering speed (anvSW), and serves as a further individual component.

7. A method according to claim 6, wherein the return torque (torAR) is additionally determined as a function of a steering torque (torSW).

8. A method according to claim 1, wherein, in an intermediate step, a base steering torque with self-alignment (torBC) is determined as a function of the base steering torque (torB) and the centering torque (torC), and the target steering torque (torTB) is found as a function of the base steering torque with self-alignment (torBC), the damping torque (torD) and the hysteresis torque (torF).

9. A method according to claim 7, wherein a target steering wheel speed (anvSWS) is determined as a function of the vehicle speed (velV) and the steering wheel angle (angSW), and the base steering torque with self-alignment (torBC) is additionally determined as a function of the target steering wheel speed (anvSWS), the steering wheel angle (angSW) and the steering speed (anvSW), with a switch taking place from the base steering torque (torB) to an undamped self-alignment torque (torC), when a detected actual steering speed (anvSW) is lower than the predefinable target steering wheel speed (anvSWS) and the base steering torque (torB) is less than the originally required self-alignment torque (torC).

10. A method according to claim 1, wherein the portion of the contribution of at least one individual component to the target steering torque (torTB) can be predefined.

11. A method according to claim 10, wherein the portions of the contributions of the individual components to the target steering torque (torTB) are automatically predefined as a function of a predefinable driving mode.

12. A method according to claim 10, wherein the portions of the contributions of the individual components to the target steering torque (torTB) are automatically predefined as a function of a current driving condition.

13. A method according to claim 1, wherein at least one further moment is determined and added to the target steering torque (torTB), the at least one further moment representing at least one of the following:
   a tire condition;
   a condition of a roadway surface;
   an unevenness of the roadway; and
   a current driving condition, in particular oversteering or understeering.

14. A method according to claim 1, wherein at least one further moment is determined and added to the target steering torque (torTB), the at least one further moment describing vibrating of the steering means to indicate a hazardous situation or displaying advice for a recommended steering direction.

15. A controller for controlling a steering device in a vehicle, wherein the controller comprises a functionality for determining a target steering torque (torB) for a steering means of the steering device, and wherein by means of the functionality:
   a base steering torque (torB) can be determined as a function of an externally acting force (torR) and a vehicle speed (velV);
   a damping torque (torD) can be determined as a function of a steering speed (anvSW) and the vehicle speed (velV);
   a hysteresis torque (torF) can be determined as a function of the steering speed (anvSW) and the vehicle speed (velV);
   a centering torque (torCF: torC) in the direction of the straight-ahead position can be determined as a function of a steering wheel angle (angSW) and the vehicle speed (velV); and
   the base steering torque (torB), the damping torque (torD), the hysteresis torque (torF) and the centering torque (torCF; torC) form individual components, as a function of which the target steering torque (torTB) can be determined.

16. A controller according to claim 15, wherein the controller is designed to carry out a method according to claim 1.

17. A computer program, which can be executed on a controller for controlling a steering device, wherein the computer program is programmed to carry out a method according to claim 1.

18. A computer program according to claim 17, wherein the computer program is stored on a memory element.

19. A computer program according to claim 17, for controlling the steering device on a microprocessor in the controller.

20. A method according to claim 11, wherein the portions of the contributions of the individual components to the target steering torque (torTB) are automatically predefined as a function of a current driving condition.

* * * * *